[30.]
WILLIAM F. CLEMMER & GEORGE H. CLEMMER.
Improvement in Pruning Shears.
No. 118,690.                            Patented Sep. 5, 1871.
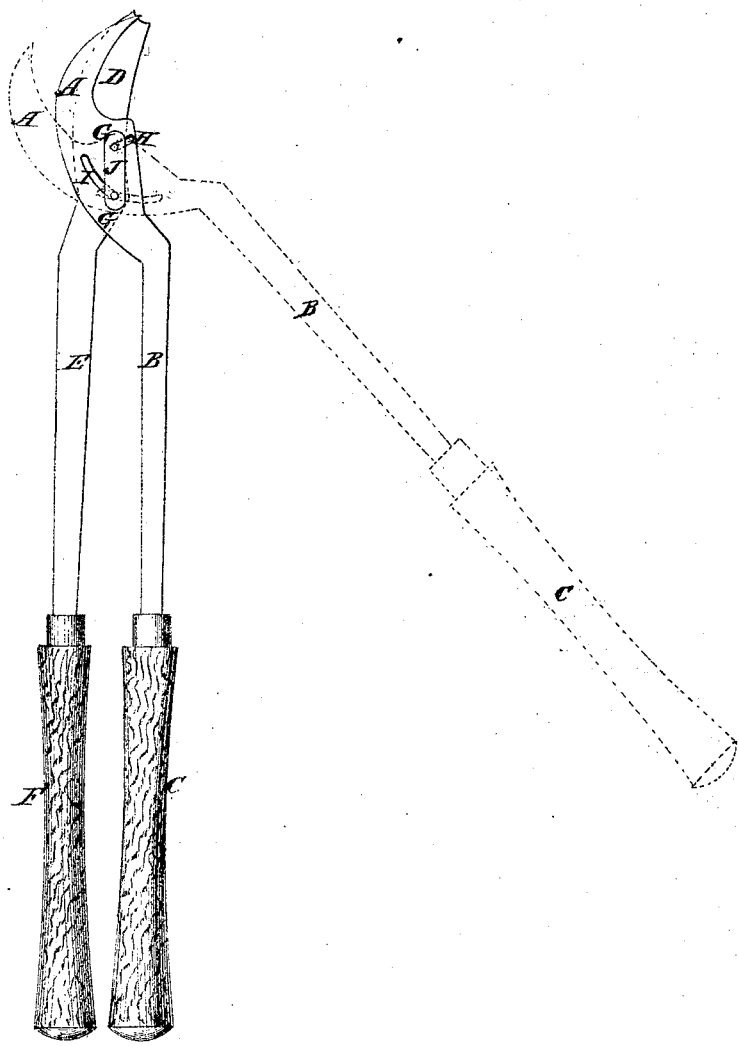

UNITED STATES PATENT OFFICE.

WILLIAM F. CLEMMER AND GEORGE H. CLEMMER, OF ALEXANDRIA, OHIO.

IMPROVEMENT IN PRUNING-SHEARS.

Specification forming part of Letters Patent No. 118,690, dated September 5, 1871.

*To all whom it may concern:*

Be it known that we, WILLIAM F. CLEMMER and GEORGE H. CLEMMER, of Alexandria, in the county of Preble and State of Ohio, have invented a new and useful Improvement in Pruning-Shears; and we do hereby declare that the following is a full, clear, and exact description thereof, which will enable others skilled in the art to make and use the same, reference being had to the accompanying drawing forming part of this specification, in which the figure is a detail side view of our improved pruning-shears.

Our invention has for its object to furnish an improved pruning-shears, simple in construction and effective in operation, and which shall be so arranged as to bring the fulcrum close to the cutting-edge, giving great power to the shears; and it consists in the two grooves and brace-plate arranged in connection with the rivets and blades of the shears, as hereinafter more fully described.

A is the hook of the shears. B is its shank, and C is its handle. D is the cutting-blade. E is its shank, and F is its handle. G are two rivets or screws, which pass through holes in the base of the cutting-blade D, and through two slots, H I, in the base of the hook A. The slot H is made short, and is curved, and the slot I is made longer and with a curve. The two slots H I are arranged with respect to each other and the hook A and blade D, as shown in the figure. The ends of the screws or rivets G pass through and are secured to a bar or plate, J, which thus strengthens and gives firmness to the sliding joint of the shears. By this construction and arrangement the fulcrum of the shears is brought close to the cutting-edge, giving great power to the shears, and the blade D acts upon the limb with a drawing cut, enabling it to shear off the limb easily and smoothly.

Having thus described our invention, we claim as new and desire to secure by Letters Patent—

The two grooves H I, the brace-plate or bar J, and the two rivets G, arranged in connection with the hook A and cutting-blade D of a pruning-shears, substantially as herein shown and described, and for the purpose set forth.

WILLIAM F. CLEMMER.
GEORGE H. CLEMMER.

Witnesses:
SAML. BLACK,
L. C. BLACK.